United States Patent
Kim et al.

(10) Patent No.: US 9,579,950 B2
(45) Date of Patent: *Feb. 28, 2017

(54) CONTROL METHOD OF AIR CONDITIONER SYSTEM FOR ELECTRIC VEHICLE

(71) Applicants: Hyundai Motor Company, Seoul (KR); Kia Motors Corporation, Seoul (KR); Halla Visteon Climate Control Corp., Daejeon (KR)

(72) Inventors: Jae Yeon Kim, Hwaseong-si (KR); Dong Won Park, Yongin-si (KR); Jun-Young Choi, Daejeon (KR); Kwang Young Shin, Daejeon (KR)

(73) Assignees: Hyundai Motor Company, Seoul (KR); Kia Motors Corporation, Seoul (KR); Halla Visteon Climate Control Corp., Daejeon (KR)

( * ) Notice: Subject to any disclaimer, the term of this patent is extended or adjusted under 35 U.S.C. 154(b) by 297 days.

This patent is subject to a terminal disclaimer.

(21) Appl. No.: 14/279,050

(22) Filed: May 15, 2014

(65) Prior Publication Data
US 2015/0165868 A1    Jun. 18, 2015

(30) Foreign Application Priority Data
Dec. 18, 2013 (KR) .......... 10-2013-0158690

(51) Int. Cl.
*B60H 1/00* (2006.01)

(52) U.S. Cl.
CPC ..... *B60H 1/00764* (2013.01); *B60H 1/00392* (2013.01); *B60H 1/00885* (2013.01)

(58) Field of Classification Search
CPC .......... B60H 1/00392; B60H 1/00764; B60H 1/00885; B60H 2001/3251; B60H 2001/326; B60H 2001/3277
See application file for complete search history.

(56) References Cited

U.S. PATENT DOCUMENTS 9,242,532 B2 * 1/2016 Kim ............ B60H 1/00885
2009/0301411 A1 * 12/2009 Iwasaki ......... B60H 1/00328
123/41.23

FOREIGN PATENT DOCUMENTS

JP    2782968 B2    5/1998
JP    2842020 B2    10/1998
(Continued)

*Primary Examiner* — Marc Norman
(74) *Attorney, Agent, or Firm* — Morgan, Lewis & Bockius LLP

(57) ABSTRACT

A control method of an air conditioner system for an electric vehicle may include circulating the refrigerant by sensing actuation of the air conditioner system while driving the electric vehicle in a state where a start of the electric vehicle is turned on, circulating and cooling the cooling water through actuation of a water pump and a cooling fan in a cooling module that includes an engine radiator, the intercooler radiator, the water-cooled condenser, and the air-cooled condenser, and controlling actuation speeds of the water pump and the cooling fan based on whether the electric vehicle stops after suddenly accelerating in a state where the air conditioner system is actuated or stops in a state where the air conditioner system is turned off after travelling, and/or based on whether an air conditioner pressure and a cooling water temperature are within predetermined set values.

10 Claims, 2 Drawing Sheets

(56) References Cited

FOREIGN PATENT DOCUMENTS

| | | | |
|---|---|---|---|
| JP | 3358303 | B2 | 12/2002 |
| JP | 4985594 | B2 | 7/2012 |
| JP | 2013-154755 | A | 8/2013 |
| KR | 10-0342774 | B1 | 6/2002 |
| KR | 10-2009-0004130 | A | 1/2009 |

* cited by examiner

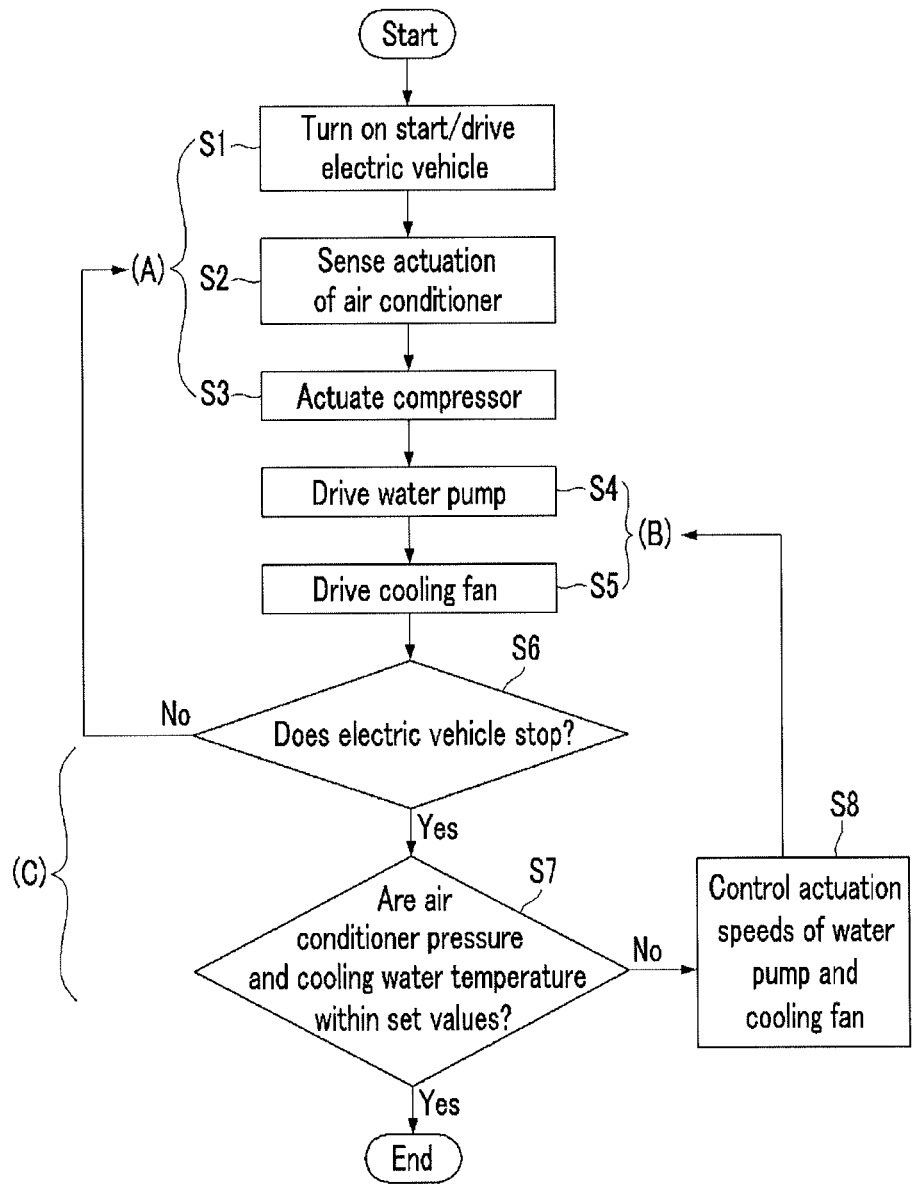

CONTROL METHOD OF AIR CONDITIONER SYSTEM FOR ELECTRIC VEHICLE

CROSS-REFERENCE TO RELATED APPLICATION

The present application claims priority of Korean Patent Application Number 10-2013-0158690 filed on Dec. 18, 2013, the entire contents of which application are incorporated herein for all purposes by this reference.

NAMES OF THE PARTIES TO A JOINT RESEARCH AGREEMENT

Hyundai Motor Company, Kia Motors Corporation, and Halla Visteon Climate Control Corp., were parties to a joint research agreement prior to the effective filing date of the instant application.

BACKGROUND OF INVENTION

Field of Invention

The present invention relates to a control method of an air conditioner system for an electric vehicle, and more particularly, to an control method of an air conditioner system for an electric vehicle that prevents a refrigerant from leaking due to deterioration in a seal caused by an increase in temperature of a compressor by preventing the refrigerant of which the temperature is increased from being supplied to the compressor by controlling operations of a water pump and a cooling fan, when the electric vehicle stops after suddenly accelerating in a state where an air conditioner is actuated or when the electric vehicle stops in a state where the air conditioner is turned off after the electric vehicle travels.

Description of Related Art

In general, an air conditioning device applied to a vehicle includes an air conditioner system which is an air conditioning device for heating and cooling an interior of the vehicle.

The air conditioner system, which can maintain a fresh indoor environment by keeping an indoor temperature of a vehicle to an appropriate temperature regardless of a change in outdoor temperature, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator.

That is, in the air conditioner system, a high-temperature and high-pressure gaseous refrigerant compressed by the compressor is condensed through the condenser and thereafter, evaporated by the evaporator through the receiver drier and the expansion valve to lower the indoor temperature and humidity in a summer cooling mode.

Herein, when a water-cooled condenser is applied to the air conditioner system for cooling in order to condense the refrigerant, cooling water is condensed through heat-exchange with the refrigerant in the condenser.

Meanwhile, in recent years, an intercooler has been applied to improve an output of the vehicle and is divided into an air-cooled intercooler or a water-cooled intercooler according to a method of cooling suctioned air.

In the air conditioner system of a vehicle applied with a system that cools the water-cooled condenser by using a radiator that cools the water-cooled intercooler through simultaneous application of the water-cooled intercooler and the water-cooled condenser as described above, when the vehicle stops traveling and stops while the air conditioner is turned on in a state where a heat emission amount maximally increases, after travelling due to sudden acceleration on an ascending road such as a mountainous region or when the vehicle stops in a state where the air conditioner is turned off after travelling, heat accumulated in the intercooler flows into the radiator, but driving-induced wind does not flow into the radiator which causes an increase in the temperature of the cooling water, and as a result, the refrigerant cannot be cooled by the cooling water in the water-cooled condenser and the refrigerant is additionally heated to make the refrigerant having the increased temperature flow into the compressor.

Further, when the high-temperature refrigerant flows into the compressor, the internal temperature of the compressor is increased and sealing applied to an inner part thereof is aged by heat, and as a result, the refrigerant may leak from the compressor and durability also deteriorates.

In addition, deterioration in condensing efficiency of the condenser and the durability of the compressor decreases overall cooling performance of the air conditioner system and increases required power of the compressor, and as a result, fuel efficiency also deteriorates.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a control method of an air conditioner system for an electric vehicle which mounts the water-cooled condenser in the intercooler radiator in the vehicle adopting a water-cooled intercooler and arranges an air-cooled condenser on the front side to be integrated with the cooling system, and when the electric vehicle stops after suddenly accelerating in a state where the air conditioner is actuated or when the electric vehicle stops in a state where the air conditioner is turned off after the electric vehicle travels, prevents a refrigerant of which the temperature is increased from being supplied to a compressor, by controlling the actuation of a water pump and a cooling fan according to air conditioner pressure and a temperature of cooling water, thereby preventing deterioration in a seal due to the increase in the temperature of the compressor and the leakage of the refrigerant.

Various aspects of the present invention provide a control method of an air conditioner system for an electric vehicle, wherein the air conditioner system includes a water-cooled condenser embedded in an intercooler radiator and configured to condense a refrigerant by receiving cooling water from a cooling system cooling an engine and an intercooler with the cooling water, and an air-cooled condenser placed in front of the intercooler radiator and configured to condense the refrigerant supplied from the water-cooled condenser through heat-exchange with outdoor air. The method may include: (A) circulating the refrigerant by sensing actuation of the air conditioner system while driving the electric vehicle in a state where a start of the electric vehicle is turned on; (B) circulating and cooling the cooling water through actuation of a water pump and a cooling fan in a cooling module including an engine radiator, the intercooler radiator, the water-cooled condenser, and the air-cooled condenser; and (C) controlling actuation speeds of the water pump and the cooling fan based on whether the electric vehicle stops after suddenly accelerating in a state where the air conditioner system is actuated or stops in a state where the air conditioner system is turned off after travelling, and/or based on whether an air conditioner pressure and a cooling water temperature are within predetermined set values.

Process (A) may include: driving the vehicle by turning on the start of the vehicle; sensing whether the air conditioner is actuated; and compressing and circulating the refrigerant by driving a compressor.

Process (B) may include: driving the water pump so that the cooling water is circulated to the engine and the intercooler from the engine radiator and the intercooler radiator of the cooling module; and actuating the cooling fan to cool the cooling module, into which the cooling water having an increased temperature is introduced, by blowing wind together with the outdoor air while cooling each of the engine and the intercooler.

Process (C) may include: judging whether the electric vehicle stops after suddenly accelerating in a state where the air conditioner is actuated or stops in a state where the air conditioner is turned off after travelling; returning to the process (A) if it is judged that the vehicle does not stop; judging whether the air conditioner pressure and the temperature of the cooling water are within predetermined set values if it is judged that the electric vehicle stops; controlling the actuation speeds of the water pump and the cooling fan and returning to the process (B) if it is judged that the air conditioner pressure and the temperature of the cooling water are not within the predetermined set values; and ending the control if it is judged that the air conditioner pressure and the temperature of the cooling water are within the predetermined set values.

The actuation speeds of the water pump and the cooling fan may be controlled in multi stages to control a flow rate of the cooling water and an air volume. The water pump may include an electric water pump and the actuation speed thereof may be controlled according to a control signal of an electronic control unit (ECU).

According to various aspects of the present invention, a control method of an air conditioner system for an electric vehicle mounts the water-cooled condenser in the intercooler radiator in the vehicle adopting the water-cooled intercooler and arranges the air-cooled condenser on the front side to be integrated with the cooling system, and when the electric vehicle stops after suddenly accelerating in a state where the air conditioner is actuated or when the electric vehicle stops in a state where the air conditioner is turned off after travelling, prevents the refrigerant of which the temperature is increased from being supplied to the compressor, by controlling the actuation of the water pump and the cooling fan according to the air conditioner pressure and the temperature of the cooling water, thereby preventing deterioration in a seal due to the increase in the temperature of the compressor and the leakage of the refrigerant.

Further, when the driving-induced wind is not introduced while the electric vehicle stops, the temperature of the refrigerant is prevented from being increased by controlling the actuation of the water pump and the cooling fan to increase the condensing efficiency, and the required power of the compressor is decreased to improve fuel efficiency of the electric vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a control flowchart for describing an exemplary control method of an air conditioner system for an electric vehicle according to the present invention.

DETAILED DESCRIPTION

Figure 1:
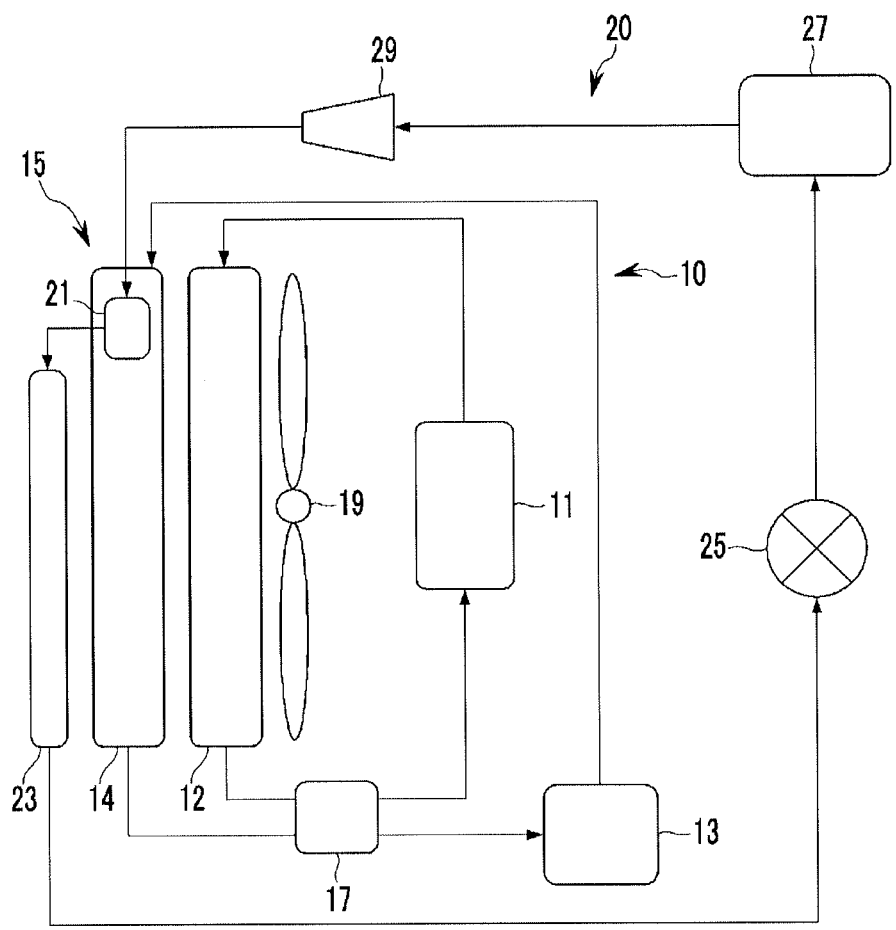
FIG. 1 is a block diagram illustrating an exemplary air conditioner system for an electric vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, unless explicitly described to the contrary, the word "comprise" and variations such as "comprises" or "comprising", will be understood to imply the inclusion of stated elements but not the exclusion of any other elements.

FIG. 1 is a block diagram illustrating a vehicle cooling system and an air conditioner system to which a control method of an air conditioner system for an electric vehicle according to various embodiments of the present invention is applied. FIG. 2 is a control flowchart for describing a control method of an air conditioner system for an electric vehicle according to various embodiments of the present invention. Referring to the drawings, the control method of an air conditioner system for an electric vehicle is applied to an air conditioner system 20 integrated with a vehicle cooling system 10.

First, as illustrated in FIG. 1, the cooling system 10 is configured to include an engine 11, an engine radiator 12 which cools cooling water through heat-exchange with outdoor air and has a cooling fan 19 in the rear thereof, an intercooler 13, an intercooler radiator 14 which is placed in front of the engine radiator 12, and cools the cooling water through the heat-exchange with the outdoor air and supplies the cooled cooling water to the intercooler 13, and a water pump 17 which circulates the cooling water cooled in each of the radiators 12 and 14.

The air conditioner system 20 includes a water-cooled condenser 21 which is installed in the intercooler radiator 14 and condenses a refrigerant through heat-exchange between the cooling water and the refrigerant, and an air-cooled condenser 23 which is placed in front of the intercooler radiator 12 and additionally condenses the condensed refrigerant discharged from the water-cooled condenser 21 through heat-exchange with the outdoor air.

Herein, the engine radiator 12, the intercooler radiator 14, the water-cooled condenser 21, the air-cooled condenser 23, and the cooling fan 19 are included in a cooling module 15 that integrates the cooling system 10 and the air conditioner system 20.

The air conditioner system 20 is configured to further (additionally or optionally) include an expansion valve 25 which expands the refrigerant discharged from the air-cooled condenser 23, an evaporator 27 which evaporates the expanded refrigerant supplied from the expansion valve 25, and a compressor 29 which receives and compresses the refrigerant discharged from the evaporator 27 and supplies the compressed refrigerant to the water-cooled condenser 21.

Meanwhile, in the air conditioner system 20, the refrigerant is discharged from the water-cooled condenser 21 and introduced into the air-cooled condenser 23 and condensed while sequentially passing through the water-cooled condenser 21 and the air-cooled condenser 23.

Herein, the control method of an air conditioner system for an electric vehicle according to various embodiments of the present invention prevents deterioration in a seal caused by an increase in temperature of the compressor and the leakage of the refrigerant by preventing the refrigerant of which the temperature is increased from being supplied to the compressor 29, by controlling operations of the water pump 17 and the cooling fan 19 according to an air conditioner pressure and a temperature of cooling water when the electric vehicle stops after suddenly accelerating in a state where an air conditioner is actuated or when the electric vehicle stops in a state where the air conditioner is turned off after travelling.

To this end, as illustrated in FIG. 2, the control method of an air conditioner system for an electric vehicle according to various embodiments of the present invention includes (A) circulating the refrigerant by sensing actuation of the air conditioner while driving the electric vehicle in a state where a start of the electric vehicle is turned on, (B) circulating and cooling cooling water through actuation of the water pump 17 and the cooling fan 19 in the cooling module 15 including the engine radiator 12, the intercooler radiator 14, the water-cooled condenser 21, and the air-cooled condenser 23, and (C) controlling actuation speeds of the water pump 17 and the cooling fan 19 by judging whether the electric vehicle stops after suddenly accelerating in a state where the air conditioner is actuated or stops in a state where the air conditioner is turned off after travelling and judging whether air conditioner pressure and a cooling water temperature are within predetermined set values according to the judgment of the stoppage of the electric vehicle, and ending the control.

First, in process (A), in the state (S1) in which the vehicle is driven by turning on the start of the vehicle, it senses or determines whether the air conditioner is actuated (S2) and the refrigerant is compressed and circulated by driving the compressor so as to perform interior cooling of the vehicle (S3).

Thereafter, in process (B), the water pump 17 is driven so that the cooling water is circulated to the engine 11 and the intercooler 13 from the engine radiator 12 and the intercooler radiator 14 of the cooling module 15 (S4), and the cooling fan 19 is actuated so as to cool the cooling module 15 into which the cooling water having the increased temperature is introduced by blowing the wind together with the outdoor air while cooling each of the engine 11 and the intercooler 13 (S5).

In process (C), it judges or determines whether the electric vehicle stops after suddenly accelerating in a state where the air conditioner is actuated or stops in a state where the air conditioner is turned off after travelling (S6).

In step (S6), when it is judged that the vehicle does not stop (that is, when the condition is not satisfied), the process returns to process (A) again to repeatedly perform the aforementioned process.

On the contrary, in step (S6), when it is judged that the electric vehicle stops (that is, when the condition is satisfied), it judges or determines whether the air conditioner pressure and the temperature of the cooling water are within predetermined set values (S7).

In step (S7), when it is judged that the air conditioner pressure and the temperature of the cooling water are not within the predetermined set values (that is, when the condition is not satisfied), the actuation speeds of the water pump and the cooling fan are controlled (S8) and the process returns to process (B).

That is, when the electric vehicle stops after suddenly accelerating in a state where the air conditioner is actuated or when the electric vehicle stops in a state where the air conditioner is turned off after travelling, accumulated heat is introduced into the intercooler radiator 14 as a heat emission amount of the intercooler 13 is maximally increased, but driving-induced wind is not introduced in a state where the electric vehicle stops, and as a result, the temperature of the refrigerant introduced into the water-cooled condenser 21 may be increased.

The increase in the temperature of the refrigerant causes the increase in the pressure of the air conditioner system 20 and the increase in the temperature of the compressor 29. Therefore, a passage flow rate is increased by controlling the actuation speed of the water pump 17, and the cooling water is maximally cooled by controlling the actuation speed of the cooling fan 19, thereby preventing the leakage of the refrigerant that occurs because internal sealing of the compressor 29 is aged by heat due to the increase in the temperature of the compressor 29.

On the contrary, when it is judged that the air conditioner pressure and the temperature of the cooling water are within the predetermined set values (that is, when the condition is satisfied), the control is ended.

Herein, the actuation speeds of the water pump 17 and the cooling fan 18 are controlled in multi stages to control the flow rate and the air volume. Further, the water pump 17 is configured to include an electric water pump and the actuation speed thereof is controlled according to a control signal of an electronic control unit (ECU) to control the flow rate of the circulated cooling water.

Accordingly, when the control method of an air conditioner system for an electric vehicle according to various embodiments of the present invention is applied, the water-cooled condenser 21 is mounted in the intercooler radiator 14 in the vehicle adopting the water-cooled intercooler 13 and the air-cooled condenser 23 is arranged on the front side to be integrated with the cooling system, and when the electric vehicle stops after suddenly accelerating in a state where the air conditioner is actuated or when the electric vehicle stops in a state where the air conditioner is turned off after travelling, the refrigerant of which the temperature is increased is prevented from being supplied to the compressor 29, by controlling the actuation of the water pump 17 and the cooling fan 19 according to the air conditioner pressure and the temperature of the cooling water, thereby preventing deterioration in a seal due to the increase in the temperature of the compressor and the leakage of the refrigerant.

Further, when the driving-induced wind is not introduced in a state where the electric vehicle stops, the temperature of the refrigerant is prevented from being increased by controlling the actuation of the water pump 17 and the cooling fan 19 to increase the condensing efficiency of refrigerant, and the required power of the compressor is decreased to improve fuel efficiency of the electric vehicle.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of an air conditioner system for an electric vehicle, wherein the air conditioner system includes a water-cooled condenser embedded in an intercooler radiator and configured to condense a refrigerant by receiving cooling water from a cooling system cooling an engine and an intercooler with the cooling water, and an air-cooled condenser placed in front of the intercooler radiator and configured to condense the refrigerant supplied from the water-cooled condenser through heat-exchange with outdoor air, the method comprising:
   (A) circulating the refrigerant by sensing actuation of the air conditioner system while driving the electric vehicle in a state where a start of the electric vehicle is turned on;
   (B) circulating and cooling the cooling water through actuation of a water pump and a cooling fan in a cooling module including an engine radiator, the intercooler radiator, the water-cooled condenser, and the air-cooled condenser; and
   (C) controlling operating speeds of the water pump and the cooling fan based on whether the electric vehicle stops after suddenly accelerating in a state where the air conditioner system is actuated or stops in a state where the air conditioner system is turned off after travelling, and based on whether an air conditioner pressure and a cooling water temperature are within predetermined set values.

2. The method of claim 1, wherein the process (A) includes:
   driving the vehicle by turning on the start of the vehicle;
   sensing whether the air conditioner is actuated; and
   compressing and circulating the refrigerant by driving a compressor.

3. The method of claim 2, wherein:
   the water pump includes an electric water pump and the operating speed thereof is controlled according to a control signal of an ECU.

4. The method of claim 1, wherein the process (B) includes:
   driving the water pump so that the cooling water is circulated to the engine and the intercooler from the engine radiator and the intercooler radiator of the cooling module; and
   actuating the cooling fan to cool the cooling module, into which the cooling water having an increased temperature is introduced, by blowing wind together with the outdoor air while cooling each of the engine and the intercooler.

5. The method of claim 4, wherein:
   the water pump includes an electric water pump and the operating speed thereof is controlled according to a control signal of an ECU.

6. The method of claim 1, wherein the process (C) includes:
   judging whether the electric vehicle stops after suddenly accelerating in a state where the air conditioner is actuated or stops in a state where the air conditioner is turned off after travelling;
   returning to the process (A) if it is judged that the vehicle does not stop;
   judging whether the air conditioner pressure and the temperature of the cooling water are within predetermined set values if it is judged that the electric vehicle stops;
   controlling the operating speeds of the water pump and the cooling fan and returning to the process (B) if it is judged that the air conditioner pressure and the temperature of the cooling water are not within the predetermined set values; and
   ending the control if it is judged that the air conditioner pressure and the temperature of the cooling water are within the predetermined set values.

7. The method of claim 6, wherein:
   the operating speeds of the water pump and the cooling fan are controlled in multi stages to control a flow rate of the cooling water and an air volume.

8. The method of claim 7, wherein:
   the water pump includes an electric water pump and the operating speed thereof is controlled according to a control signal of an ECU.

9. The method of claim 6, wherein:
   the water pump includes an electric water pump and the operating speed thereof is controlled according to a control signal of an ECU.

10. The method of claim 1, wherein:
   the water pump includes an electric water pump and the operating speed thereof is controlled according to a control signal of an electronic control unit (ECU).

* * * * *